Nov. 28, 1939.   D. NICOL, JR   2,181,626
EQUALIZER FOR MECHANICALLY OPERATED AUTOMOBILE BRAKES
Filed March 15, 1939   2 Sheets-Sheet 1
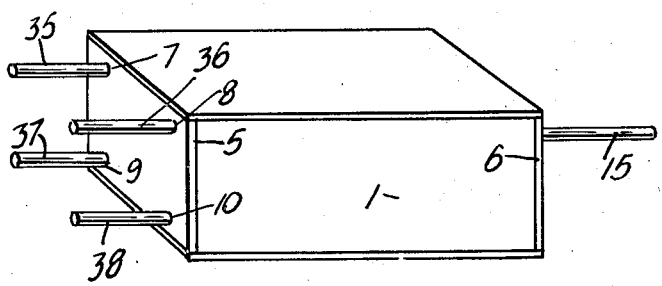
FIG.I.
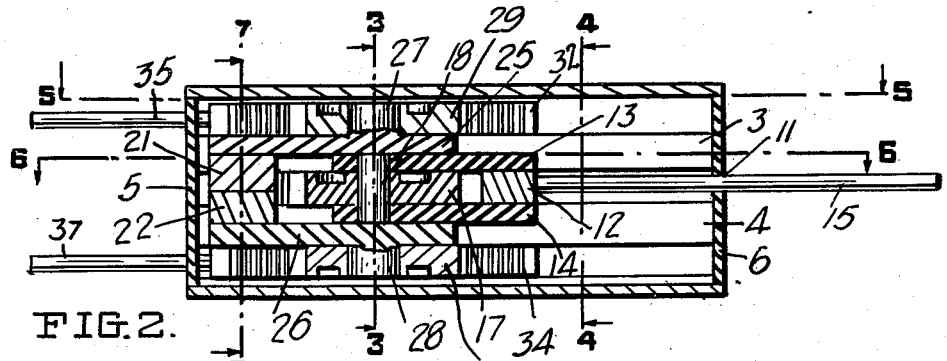
FIG.2.
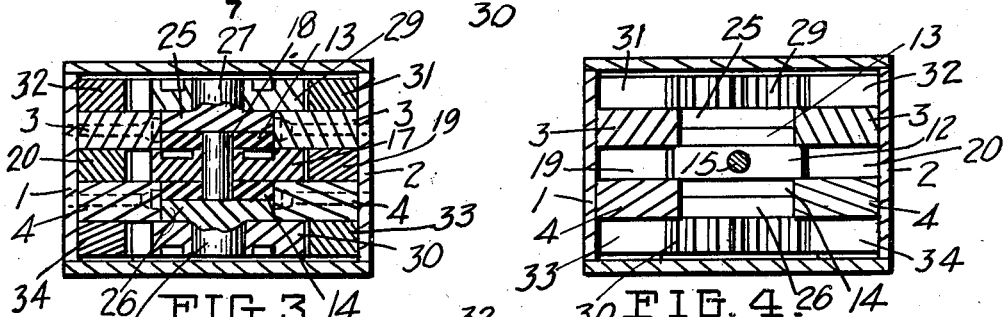
FIG.3.   FIG.4.
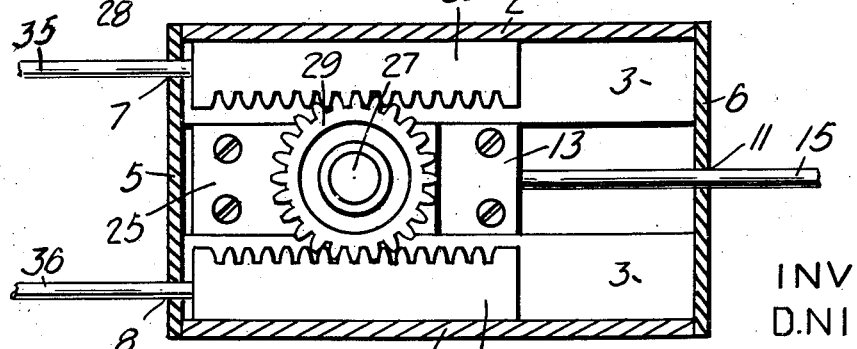
FIG.5
INVENTOR
D. NICOL JR.
BY
ATTORNEYS.

Nov. 28, 1939.  D. NICOL, JR  2,181,626
EQUALIZER FOR MECHANICALLY OPERATED AUTOMOBILE BRAKES
Filed March 15, 1939  2 Sheets-Sheet 2
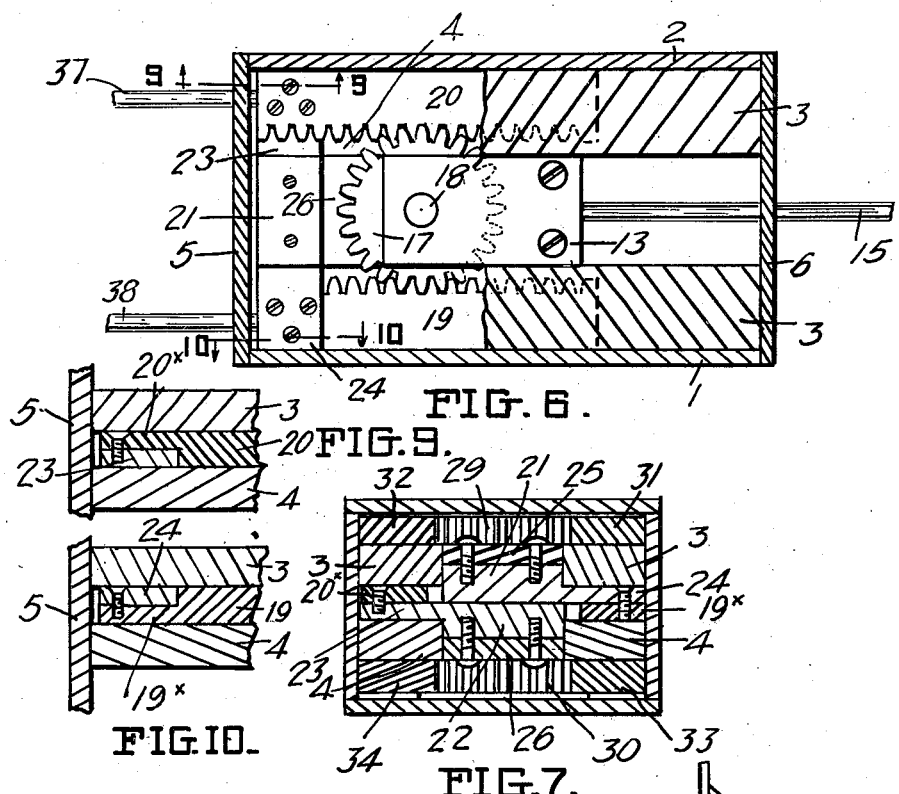
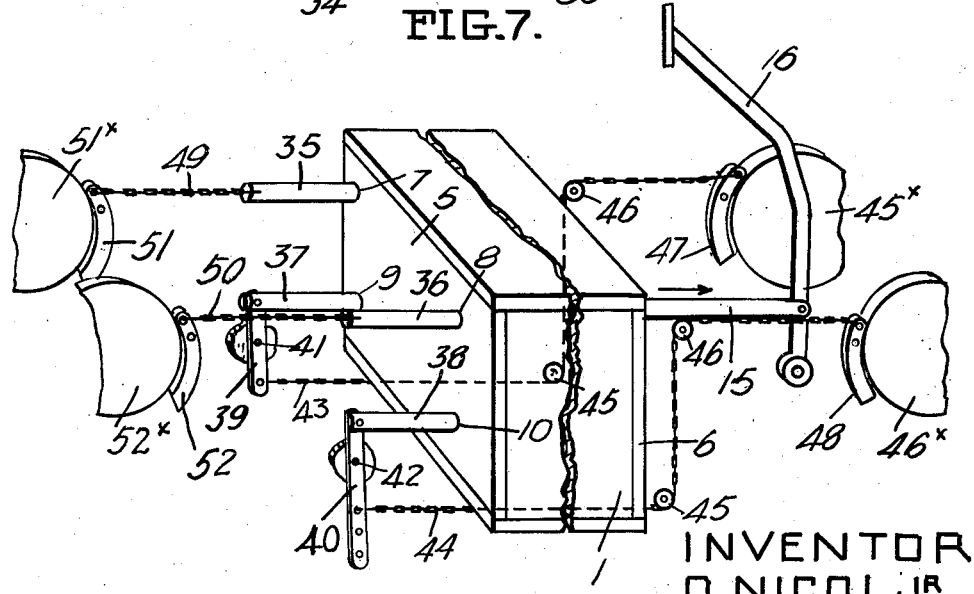
INVENTOR
D. NICOL JR
BY
ATTORNEYS Patented Nov. 28, 1939

2,181,626

UNITED STATES PATENT OFFICE 2,181,626

EQUALIZER FOR MECHANICALLY OPERATED AUTOMOBILE BRAKES

David Nicol, Jr., Willowdale, Ontario, Canada

Application March 15, 1939, Serial No. 261,907

1 Claim. (Cl. 188—204)

My invention relates to improvements in equalizers for mechanically operated automobile brakes and the object of the invention is to automatically carry all the brake shoes to the braking position before applying the braking pressure when any of such shoes are removed from the braking position either due to different amounts of slack in the connections between the brake pedal and shoes or due to different amounts of wear in the wearing surface of the brake shoes, and it consists essentially in the arrangement and construction of parts as hereafter explained.

Fig. 1 is a perspective view of my device.

Fig. 2 is a longitudinal sectional view through Fig. 1.

Fig. 3 is a transverse section on line 3—3 Fig. 2.

Fig. 4 is a transverse section on line 4—4 Fig. 2.

Fig. 5 is a plan section on line 5—5 Fig. 2.

Fig. 6 is a plan section on line 6—6 Fig. 2.

Fig. 7 is a transverse section on line 7—7 Fig. 2.

Fig. 8 is a diagrammatic view showing the connections of my device to the brake shoes and brake pedal.

Figs. 9 and 10 are sectional details on lines 9—9 and 10—10 Fig. 6.

In the drawings like characters of reference indicate corresponding parts.

1 and 2 are the side walls of a rectangular casing provided with upper and lower opposing guide ribs 3 and 4 secured thereto or formed integral therewith and forming upper, lower and intermediate guide ways. 5 and 6 are the end walls.

The end wall 5 is provided with upper orifices 7 and 8 and lower orifices 9 and 10 and the end wall 6 with a central orifice 11.

A cross bar 12 is slidably held between the guide ribs 3 and 4. A plate 13 secured at one end to the upper face of the cross bar 12, is slidable between the guide ribs 3 and a plate 14, secured at one end to the lower face of the cross bar 12, is slidable between the guide ribs 4.

A pull rod 15 extends from the cross bar 12 through the orifice 11 and is pivotally connected at its outer end to the brake pedal 16. (See Fig. 8.)

Between the plates 13 and 14 is journalled a gear 17 on a pin 18. Rack bars 19 and 20 are slidably held between the guide ribs 3 and 4 at each side of the casing 1 so as to mesh with the gear 17.

21 and 22 are slide pieces slidable respectively between the upper bars 3 and the lower bars 4 and provided with lateral extensions 23 and 24. The rear end of the rack bar is reduced at 19× and secured to the extension 23 and the rear end of the rack bar 20 is reduced at 20× and secured to the extension 24.

A plate 25 is slidable between the guide ribs 3 and a plate 26 between the guide ribs 4.

The plate 25 is secured to the slide piece 21 and the plate 26 to the slide piece 22. 27 is a cylindrical stud extending from the plate 25 and 28 is a cylindrical stud extending from the plate 26. The studs 27 and 28 are in vertical alignment with the pin 18.

On the stud 27 is revolubly mounted a gear 29 and on the stud 28 a gear 30. Rack bars 31 and 32 are slidable on the guide ribs 3 so as to mesh with each side of the gear 29. Rack bars 33 and 34 are slidably mounted beneath the guide ribs 4 so as to mesh with each side of the gear 30.

Pull rods 35 and 36 extend respectively from the rack bars 32 and 31 through the orifices 7 and 8 of the casing and pull rods 37 and 38 extend respectively from the rack bars 34 and 33 through the orifices 9 and 10 of the casing 1.

The rods 37 and 38 are pivotally connected to the upper ends of the levers 39 and 40 which are pivotally mounted at 41 and 42 to any suitable supporting structure.

The lower ends of the levers 39 and 40 are connected by chains 43 and 44 passing over pulleys 45 and 46 to the front brake shoes 47 and 48 coacting with the brake drums 45× and 46×. The pull rods 35 and 36 are connected by chains 49 and 50 to the rear brake shoes 51 and 52 coacting with the brake drums 51× and 52×.

In the operation of the device it is assumed that there is more slack in the connection 49 to the brake shoe 51 than in the connection 50, 44 and 43 and the operation will be as follows:

The pedal 16 is pressed forward in the usual manner pulling the rod 15 in the direction of arrow. (See Fig. 8.)

The pull on the rod 15 draws the gear 17 and the rack bars 19 and 20 equally in a forward direction such direction being indicated by arrow in Fig. 8.

By the forward movement of the rack bars 19 and 20 the pieces 21 and 22 secured respectively to the rack bars 19 and 20, the plates 25 and 26 secured to the pieces 21 and 22, the studs 27 and 28 carried respectively by the plates 25 and 26, the gears 29 and 30 journalled respectively on the studs 27 and 28, the racks 31 and 32 meshing with opposite sides of the gear 29, the racks 33 and 34 meshing with opposite sides of the gear 30, the rods 35 and 36 formed respectively integral with the racks 31 and 32 and the rods 37 and 38 formed respectively integral with the racks 33 and 34 are carried forward in unison until one or more of the brake shoes 47, 48, 51 and 52 engage a coacting brake drum preventing further movement of those rods 35, 36, 37 and 38 which are connected to the engaged shoes.

In this illustration of the operation the rod 35 is connected by the slack connection 49 to the brake shoe 51. As soon as the remaining shoes 47, 48 and 52 are drawn into contact with the drums 45×, 46× and 52× the racks 31, 33 and 34 are held stationary from further forward movement. The racks 33 and 34 being stationary, the gear 30, stud 28, plate 26 and piece 22 are also held stationary holding the rack 20 stationary.

The pull on the rod 15 extending through the cross bar 12, plates 13 and 14 to the pin 18 causes the gear 17 to roll forward on the rack 20 so that the rack 19 geared to the opposite side of the gear 17 is further carried forward.

The rack bar 19 being connected by the extension 19× to the cross piece 21 causes such rack bar 19 and cross piece 21 to move further forward carrying with them the plates 25 stud 27 and gear 29. This operation causes the gear 29 to roll on the stationarily held rack 31, moving the rack 32 meshing with the opposite side of the gear 29 further forward pulling the rod 35 which is integral therewith also further forward to take up whatever slack there is in the connection 49.

If both connection 49 and 50 are slack the operation is similar. In this case, however, both connection 49 and 50 being slack neither racks 31 and 32 are held stationary and therefore there is no rolling action of the gear 29 on either of these racks. As the gear 29 is moved forward without rotation it draws both racks 31 and 32 forward to tighten the connections 49 and 50 drawing the shoes 51 and 52 into contact with the brake drums 51× and 52×.

Similarly, if the connections 43 and 44 are the slack connections, all the connections 43, 44, 49 and 50 are drawn upon initially to first draw the brake shoes 51 and 52 into contact with their brake drums and then the remaining slack is taken up in the connections 43 and 44 by the gear 17 rolling on the rack 19 to carry the rack 20 crosspiece 22, plate 26, stud 28, gear 30 and rack bars 33 and 34 forward.

The rods 35 and 36 being held from further movement by the contact of the brake shoes 51 and 52 with the drums 51× and 52×, the gear 29 is held stationary together with the plate 25, the piece 21 secured to the plate 25 being also held stationary together with the rack 19 secured thereto. The gear 17 then rolls on the rack 19 moving the rack 20 forward together with the piece 22 which carries the stud 28, gear 30 and rack bars 33 and 34 also further forward to draw the connections 43 and 44 into tight braking contact.

If the connections 49 and 43 or the connections 50 and 44 are the slack connections the pull on the rod 15 draws the gear 17 forward carrying the racks 19 20 in the same direction together with the pieces 21 and 22 to carry the plates 25 and 26 and the gears 29 and 30 mounted thereon forward and thereby carry the racks 31, 32, 33, 34 forward until the shoes 51 and 47 or 52 and 48 contact with their respective brake drums. The gears 29 and 30 then roll on the racks 31 and 33 or racks 32 and 34 to carry further forward the opposing racks 32 and 34 or 31 and 33 to take up the slack in the connections 49 and 50 or 43 and 44.

Actual demonstration has shown that when the brake drums are well greased there will be no braking effect produced by the drawing of the brake shoes having the slack connections into contact with the drums prior to the take up of the slack in the slack connection and all the shoes carried into contact to simultaneously produce the braking action.

In order to vary the pressure exerted on the front and rear brake shoes the point of connection between the chains 43 and 44 and the levers 39 and 40 may be varied as indicated in Fig. 8 of the drawings.

What I claim as my invention is:

In an equalizer for mechanically operated automobile brakes, the combination with the front and rear brake shoes and the brake pedal, of a casing located between the front and rear shoes and having opposing upper and lower guide ways and opposing intermediate guide ways, a rack bar slidable in each upper guide way, a rack bar slidable in each lower guide way, a plate slidably mounted between the guides forming the upper guide way, a plate slidably mounted between the guides forming the lower guide way, a gear rotatably mounted on each plate and meshing with the upper and lower racks, a connection between each upper rack and corresponding rear brake shoe, a connection between each lower rack and the corresponding front brake shoe, and means operated by the brake pedal for moving forward the plate connected to the shoes which have to be adjusted to the equalizing position while the other plate remains stationary when the corresponding shoes assume their braking position, such means comprising opposing rack bars slidable in the intermediate guide way of the casing, means for connecting one rack bar to the upper slide plate and the other rack bar to the lower slide plate, a member slidably mounted on the intermediate guide way and connected to the brake pedal, and a gear rotatably mounted on the intermediate slide member and meshing with the intermediate racks.

DAVID NICOL, Jr.